United States Patent
Mohamadi (10) Patent No.: US 9,369,259 B2
(45) Date of Patent: Jun. 14, 2016

(54) W-BAND COMBINER-SPLITTER FABRICATED USING 3-D PRINTING

(71) Applicant: Farrokh Mohamadi, Irvine, CA (US)

(72) Inventor: Farrokh Mohamadi, Irvine, CA (US)

(73) Assignee: Farrokh Mohamadi, Irvine, CA (US)

( * ) Notice: Subject to any disclaimer, the term of this patent is extended or adjusted under 35 U.S.C. 154(b) by 0 days.

(21) Appl. No.: 14/622,684

(22) Filed: Feb. 13, 2015

(65) Prior Publication Data

US 2015/0229460 A1 Aug. 13, 2015

Related U.S. Application Data

(60) Provisional application No. 61/939,674, filed on Feb. 13, 2014, provisional application No. 61/941,059, filed on Feb. 18, 2014.

(51) Int. Cl.
*H04B 1/00* (2006.01)
*H04L 5/08* (2006.01)
*H04B 7/04* (2006.01)
*H01Q 21/06* (2006.01)

(52) U.S. Cl.
CPC .. *H04L 5/08* (2013.01); *H04B 7/04* (2013.01); *H01Q 21/061* (2013.01); *Y10T 29/49016* (2015.01)

(58) Field of Classification Search
USPC .......................................................... 375/130
See application file for complete search history.

(56) References Cited

U.S. PATENT DOCUMENTS 5,870,063 A * 2/1999 Cherrette et al. ............. 343/853
2002/0180639 A1* 12/2002 Rickett et al. ................ 342/372

* cited by examiner

*Primary Examiner* — Lihong Yu
(74) *Attorney, Agent, or Firm* — Haynes and Boone, LLP (57) ABSTRACT

Methods and systems are disclosed for scalable antenna arrays that may be built up using pluggable tiles that have low distortion, flat band high gain, and structured to channelize the signals into narrow bands that may be 40 MHz or even smaller bandwidth apart. Antenna array tiles may employ traveling wave tube (TWT) components and wafer scale arrays. H-topology, equal length, feed networks connect the signals to antenna elements. The fractal-like, recursively repeating at different size scales, structure for the H-tree feed networks, implemented using pluggable tiles, facilitates the scalability of the high gain waveguide antenna array. System integration across the 75-115 GHz spectral band implements scalable aperture architecture with emphasis on addressing considerations of the TX power requirement, feed network, channelizing signals at different frequency bands using specially designed diplexers and combiners, cooling, component placement, and isolation.

15 Claims, 13 Drawing Sheets

FIG. 14B

W-BAND COMBINER-SPLITTER FABRICATED USING 3-D PRINTING

CROSS REFERENCE TO RELATED APPLICATIONS

This application claims the benefit of priority from U.S. Provisional Patent Application No. 61/941,059, filed Feb. 18, 2014, and also from U.S. Provisional Patent Application No. 61/939,674, filed Feb. 13, 2014, both of which are incorporated by reference.

BACKGROUND

1. Field of the Invention

The present invention relates generally to radar systems and, more particularly, to the transmission over longer distances operating in the W-Band enabled by scalable arrays using 3-D printed components such as 3-D printed diplexers or combiner-splitters that form spatial power combining and beam forming.

2. Related Art

There is a need to enable capability of the transmission of communication systems to longer distances (or equivalently in noisy, or "hotspot" environments) operating in the W-band (75-115 GHz) of the electromagnetic spectrum. Transmitter systems (e.g., comprising one or more power amplifiers, matching networks, and radiating elements) need to be capable of achieving 1.0-4.0 kilo Watts (kW) or greater effective radiated power (ERP) for small footprint (e.g., less than 1.0 square foot) applications and capable of being combined to achieve 100 kW or greater ERP for large platform (more than 1.0 square foot) applications. In either case, the transmitter system should exhibit low distortion, flat band high gain, and be able to channelize the signals into 40 MHz or smaller bandwidth separation.

DETAILED DESCRIPTION

The present disclosure presents examples of embodiment addressing the need to enable capability of the transmission of communication systems to longer distances (or equivalently in noisy, or "hotspot" environments) or a jammer operating in the W-band (75-115 GHz) of the electromagnetic spectrum. Transmitter systems (e.g., comprising one or more power amplifiers, matching networks, and radiating elements) need to be capable of achieving 1.0-4.0 kilo Watts (kW) or greater effective radiated power (ERP) for small footprint (e.g., less than 1.0 square foot) applications and capable of being combined to achieve 100 kW or greater ERP for large platform (more than 1.0 square foot) applications. In either case, the transmitter system should exhibit low distortion, flat band high gain, and be able to channelize the signals into 40 MHz or smaller bandwidth separation. In one or more embodiments, scalable antenna arrays may be built up using pluggable tiles that have low distortion, flat band high gain, and structured to channelize the signals into narrow bands that may be 40 MHz or even smaller bandwidth apart. Tile implementations may employ, for example, traveling wave tube (TWT) components or wafer scale arrays. In one or more embodiments, in-depth end-to-end system integration across the 75-115 GHz spectral band implements scalable aperture architecture with emphasis on addressing considerations of the TX power requirement, feed network, channelizing signals at different frequency bands using specially designed diplexers and combiners, cooling, component placement, and isolation.

One or more embodiments may include implementation of a fully integrated transmitter (TX) "tile" as an element of a larger integrated and scalable high power transmitter module comprising a planar (e.g., as opposed to "stacked") array of such tiles, each single tile size (in planar array) less than about 1.5 inches (in.) per side by less than about 3.0 in. thickness.

One or more embodiments may include implementation a 3-D printed combiner for a Travelling Wave Tube (TWT) power amplifier (PA) and a horn antenna as an element of a "tile" that performs pencil beam forming for a transmitter. As readily understood by one of ordinary skill in the art, for a comparable receiver, the 3-D printed combiner may be adapted for use as a splitter and incorporated in a comparable system or method, with low noise amplifiers (LNA) in place of PA, and horn antenna as an element of a "tile" that performs pencil beam forming for reception. In the description and claims, it should be understood that a similar substitution can be made for describing receivers and splitters even if only transmitters and combiners are explicitly mentioned.

One or more embodiments may include implementing a wafer scale planar active array as a "tile" for scalability and a 3-D printed diplexer or combiner that forms spatial power combining and beam forming as part of a scalable array of such tiles. One or more embodiments may include implementation of a planar module comprising tiles operating at 75-115 GHz bandwidth. One or more embodiments may include expandability and scalability of transmit and receiver modules and antenna arrays using multiple "tiles" that can be physically plugged (including electrical and waveguide connections) to a separate feed network substrate to provide, for example, as much as 100 kW ERP. One or more embodiments may include implementation of a "hotspot" transponder to transmit and receive 40 Gbps (giga-bits per second) data over, for example, 40 MHz or 1 GHz bandwidth channels. One or more embodiments may include implementation of 3-D diplex based mux (e.g., multiplexer module) and demux (e.g., de-multiplexer module) for channelization (e.g., apportioning transmission into distinct frequency bands or channels), referred to as a "channelizer". One or more embodiments may include implementation of a 3-D printing manufacturing of the diplexer based 3-D channelizer. One or more embodiments may include an order of magnitude improvement in size-weight-and-power (SWAP) (e.g., single tile size max 1.5 in. per side with max 3.0 in. thickness and weight of the tile less than 3.0 lbs.) compared to using a dish reflector antenna or dish reflector antenna array to attempt to achieve comparable performance.

Various embodiments may incorporate teachings from:
U.S. Pat. No. 8,766,743, issued Jul. 1, 2014, entitled "Wafer Scale Spatial Power Combiner";
U.S. Pat. No. 8,237,604, issued Aug. 7, 2012, entitled "Virtual Beam Forming in Ultra Wideband Systems";
U.S. Pat. No. 8,154,339, issued Apr. 10, 2012, entitled "V-Band High-power Transmitter with Integrated Power Combiner";
U.S. Pat. No. 7,884,776, issued Feb. 8, 2011, entitled "High Power Integrated Circuit Beamforming Array";
U.S. Pat. No. 7,782,111, issued Aug. 24, 2010, entitled "Narrow Pulse Generator";
U.S. Pat. No. 7,697,958, issued Apr. 13, 2010, entitled "Wireless Repeater";
U.S. Pat. No. 7,554,504, issued Jun. 30, 2009, entitled "Integrated Circuit Beamforming Horn Array"; and
U.S. Pat. No. 7,548,205, issued Jun. 16, 2009, entitled "Wafer Scale Antenna Module with a Backside Connectivity", all of which are incorporated by reference.

Figure 1:
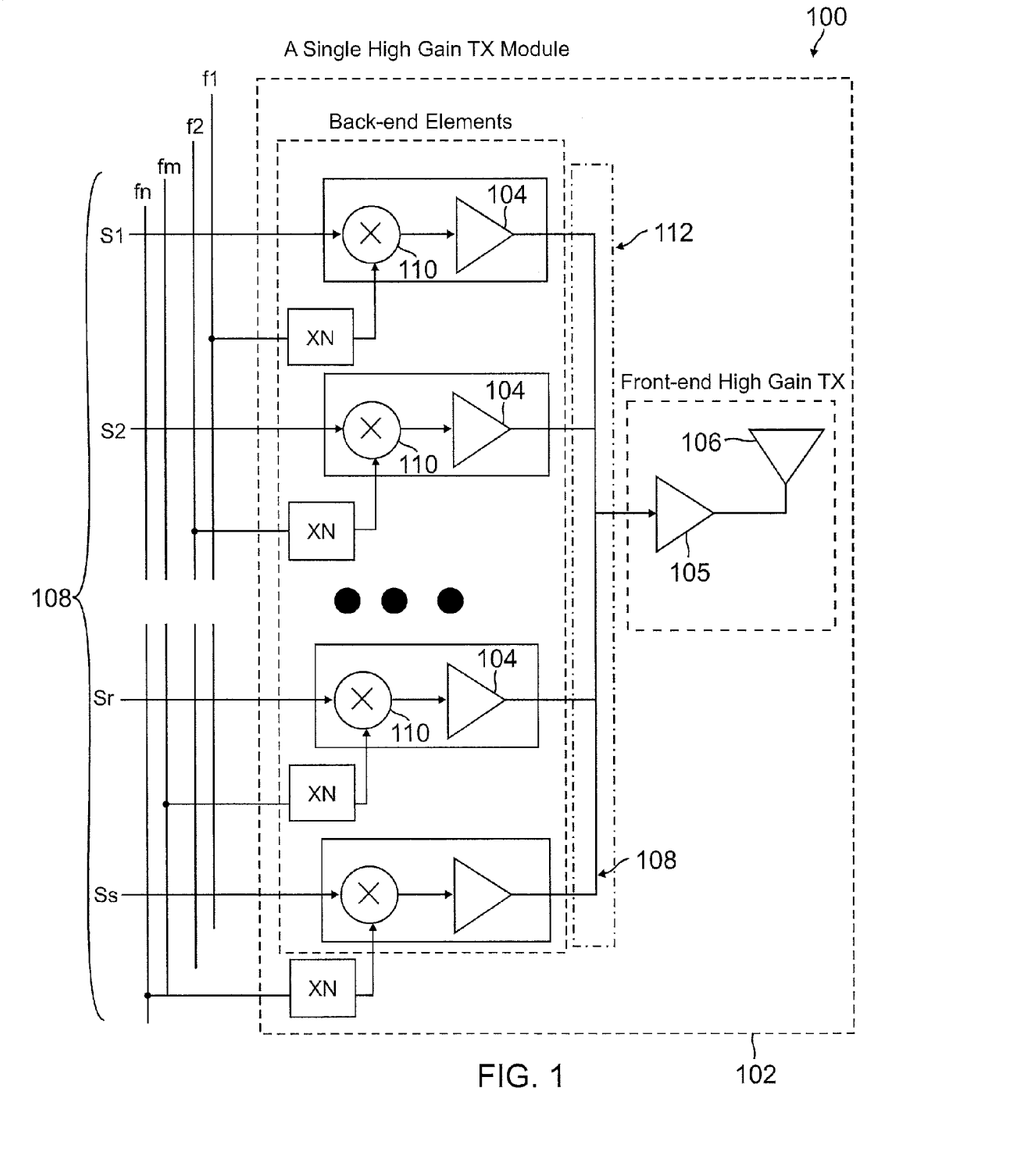
FIG. 1 is a block diagram for a scalable tile implementation of channelized combiner with travelling wave tube (TWT) and high gain waveguide antenna for wireless applications, in accordance with one or more embodiments.
Figure 4A:
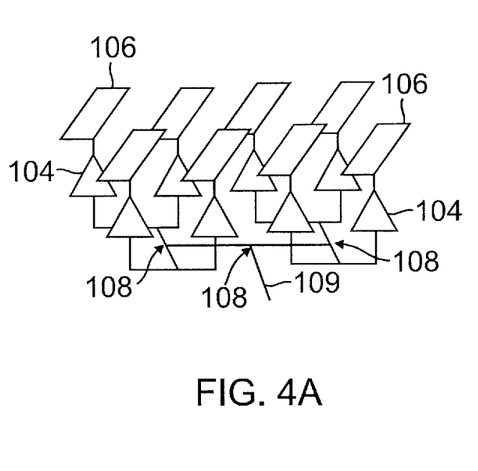
FIG. 4A and FIG. 4B are schematic diagrams showing two different examples of H-topology equal length feed networks for scalable tile arrays and solid state based high power amplifier distribution under each tile of an array, in accordance with one or more embodiments.
Figure 4B:
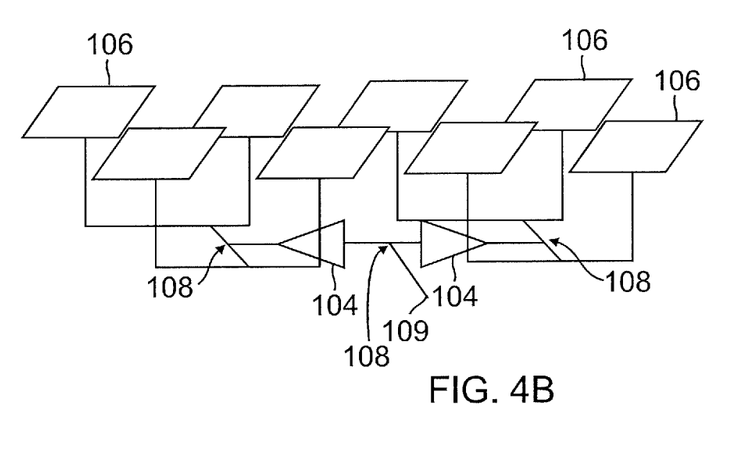

FIG. 1 shows a system block diagram for electronic components of a scalable tile 102 for a channelized combiner that may be included as part of a transmitter (inversely receiver, as described above) for a high gain waveguide antenna array 100 for wireless applications, in accordance with one or more embodiments. Tile 102 may include power amplifier 104, travelling wave tube (TWT) amplifiers 105, and high gain waveguide antenna 106 which may be fed a radio frequency (RF) signal through feed network 108. Some components (e.g., portions of feed network 108, power amplifiers 104, upconverters 110, multiplexers (inversely de-multiplexers) 112 may be considered as back-end elements and may be grouped on one portion (e.g., back side) of tile 102, while other components (e.g., TWT amplifier 105, antenna element 106) may be considered as front-end, high gain elements and grouped on another portion (e.g., front side) of tile 102, as indicated in FIG. 1. Portions of feed network 108 and other components, such as vias, may pass through a substrate of the tile 102 between the front and back sides. FIG. 1 shows one example of the distribution under each tile's array of antenna elements 106 of power amplifiers 104 and another TWT high power amplifier 105. For FIG. 1, only one antenna element 106 is shown for tile 102, but each tile 102 may have an array of antenna elements 106 and differing distributions of amplifiers 104, 105, as seen in FIGS. 4A, 4B, for example. Depending on the power delivery capability of the TWT amplifiers 105, a ratio of one front-end TWT power amplifier 105 to one antenna 106 may be chosen as shown in the example depicted in FIG. 1.

In one or more embodiments, the local oscillator signal (f1, f2, . . . fm, fn) may be used to channelize input signals (S1, S2, . . . Sr, Ss) to be combined and delivered to the ultra wide band (UWB) W-band high power transmitter arrays (e.g., high gain waveguide antenna array 100). The signal may be up-converted (e.g., at upconverters 110) to 4×10 GHz (or any combination such as 32,768×10 MHz) channels. For example, the combined signal shown in the figure may be spread over the entire 75-115 GHz bandwidth and then amplified and transmitted through the tiles 102.

Figure 2:
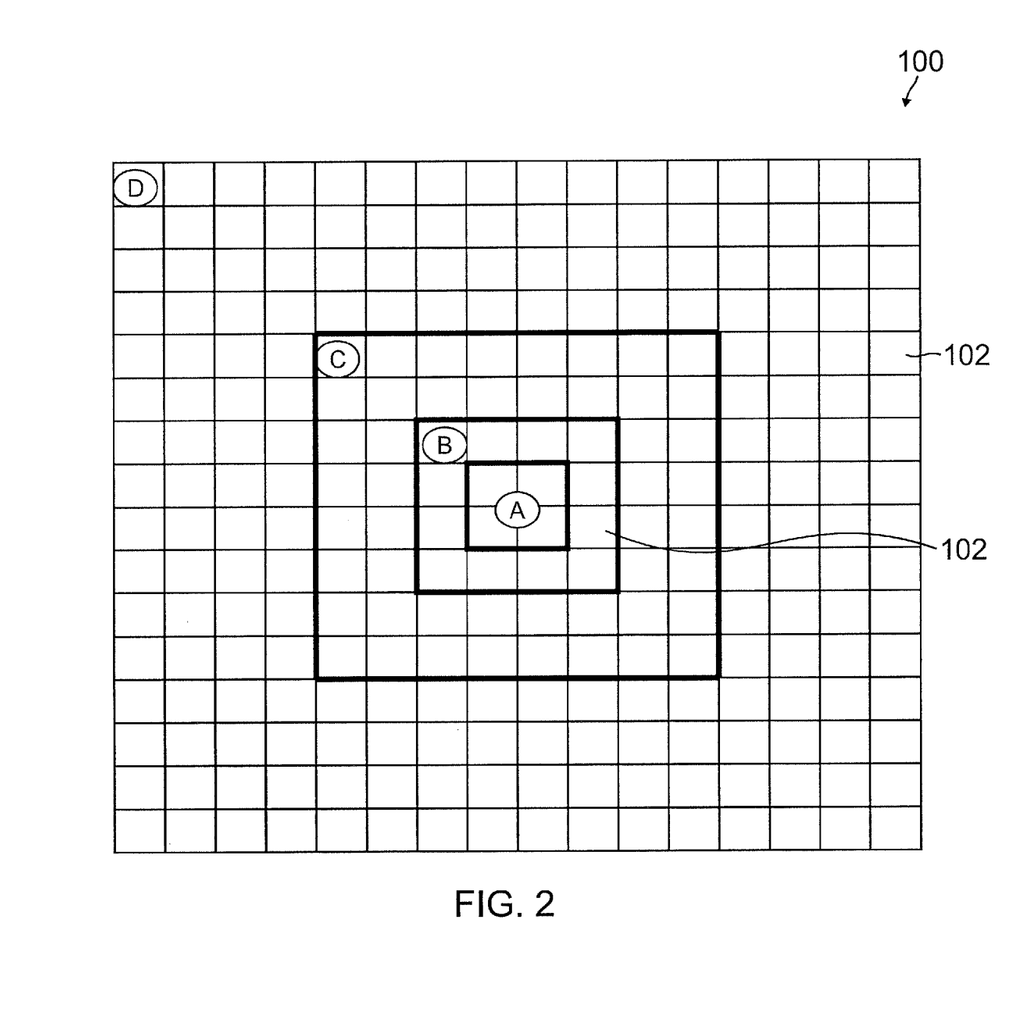
FIG. 2 is a diagram illustrating scalability of tile implementations for high gain waveguide antenna arrays, in accordance with one or more embodiments.
Figure 8:
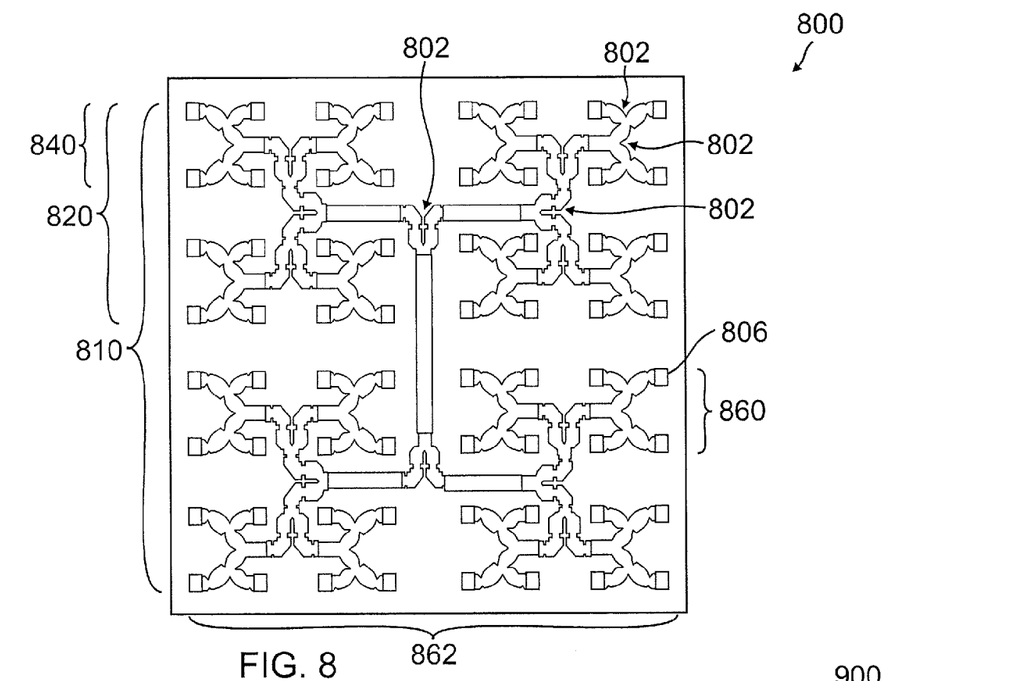
FIG. 8 is a diagram showing a tile tessellation pattern for an 8×8, H-topology, equal length feed, waveguide based channelizer for radio frequency transmission or reception, in accordance with one or more embodiments, using 2:1 splitters (combiners).
Figure 9:
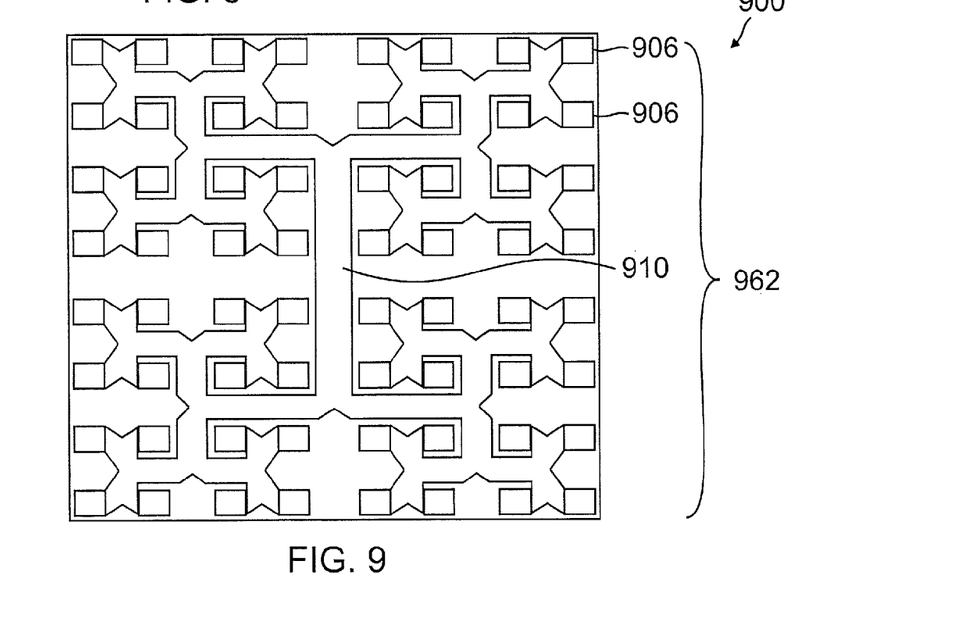
FIG. 9 is a tile tessellation pattern for an 8×8, H-topology, equal length feed, waveguide based channelizer for radio frequency transmission or reception, in accordance with one or more embodiments, having a more compact layout than FIG. 8 by using 4:1 splitters (combiners).
Figure 10:
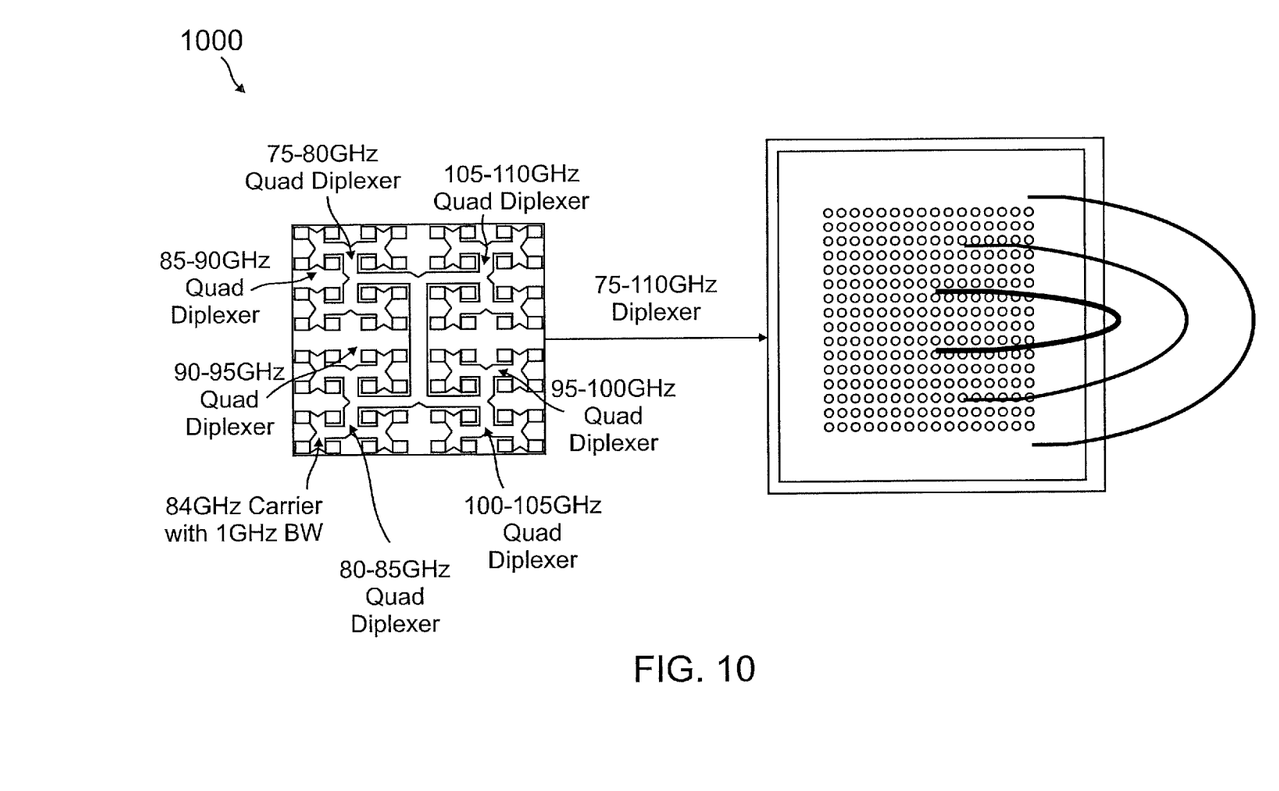
FIG. 10 is a pictorial representation of an example of a narrow band (1 GHz) signal at 84 GHz amplified and transmitted through an 8×8 scalable array, in accordance with one or more embodiments.
Figure 11:
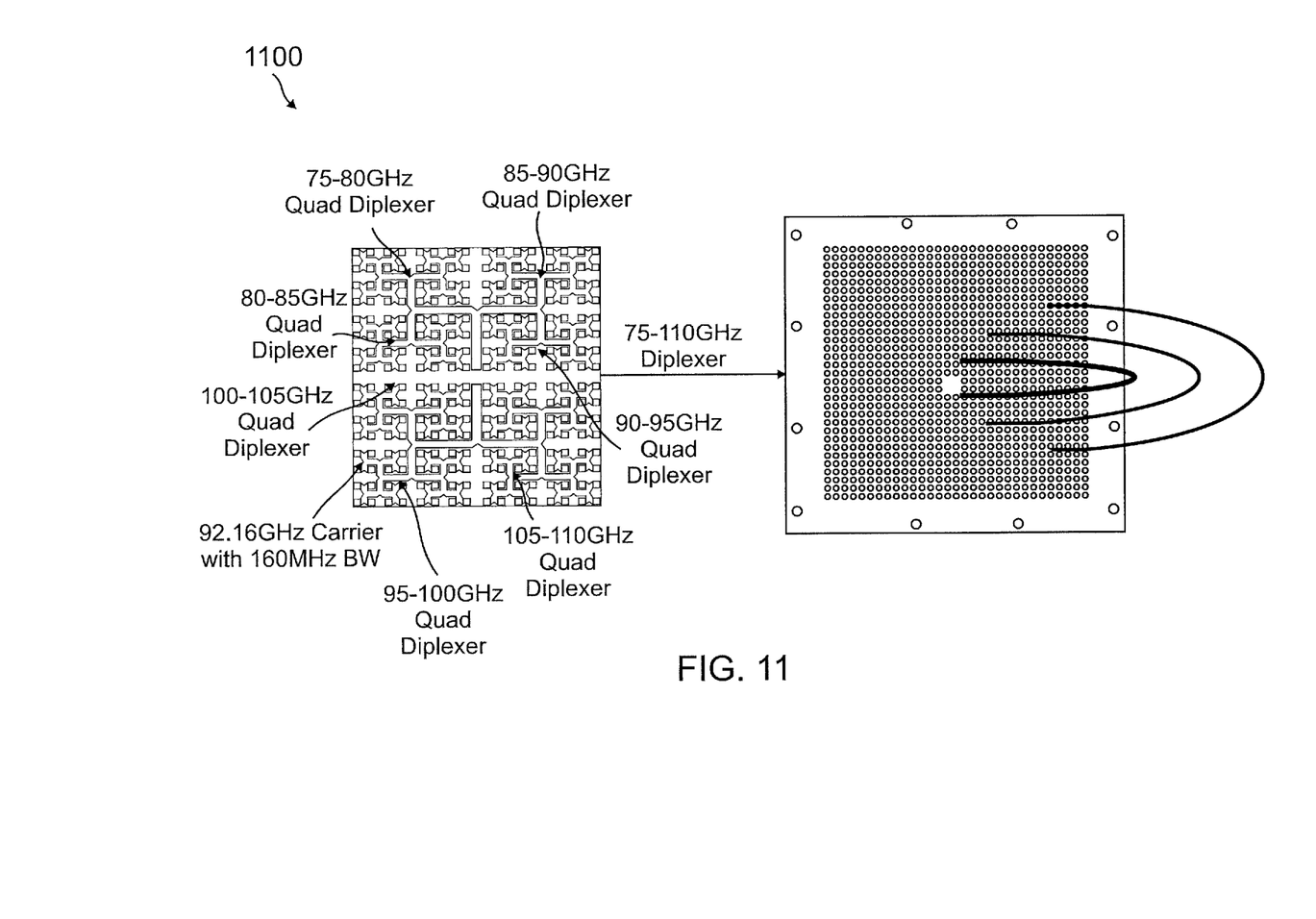
FIG. 11 is a pictorial representation of an example of a narrow band (160 MHz) signal at 92.16 GHz amplified and transmitted through a 16×16 scalable array, in accordance with one or more embodiments.
Figure 12:
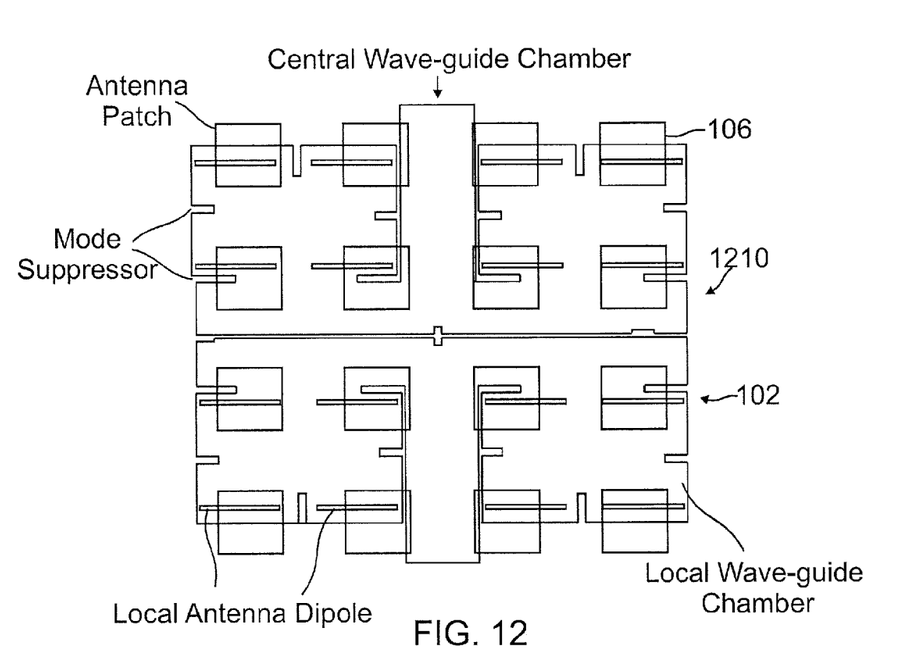
FIG. 12 is a diagram showing an equal-distance waveguide for radio frequency signal distribution to active units under the antenna for a 4×4 antenna-element array tile, in accordance with one embodiment.

FIG. 2 is a diagram illustrating scalability of tile implementations for high gain waveguide antenna arrays 100, in accordance with one or more embodiments. Each tile 102 may include, for example, 16×16 antenna array elements (as seen in FIG. 11); 4×4 antenna array elements (as seen in FIG. 12, 13); or 8×8 antenna array elements (as seen in FIGS. 8, 9, 10) or a single horn array with equivalent radiation power capability. As seen in FIG. 8, for example, repetition of a tile pattern at different size scales together with a recursively repeating H pattern of interconnecting (vie feed network 108) the repeating tile patterns (referred to herein as "H-topology") facilitates scalability in that repetition of a few basic tile 102 patterns can be used to fabricate arrays of differing sizes such as array A (1×1), array B (4×4), array C (8×8), and array D (16×16) shown in FIG. 2. The H-topology has a further useful property that the signal path length from an initial injection point 109 (see FIGS. 4A, 4B) of the RF signal to each antenna element 106 of one of the waveguide antenna arrays 100 is substantially the same, no matter if the tile 102 is at or nearer the center of the array or at or nearer an edge of the array (referred to as "equal path length" or "equal length feed network").

For scalability of high gain waveguide antenna arrays 100 formed from an array of tiles 102, consideration must be given to heat dissipation management for the agglomeration of tiles 102. Based on the examples of transmitted power given above for a transmitter with 4 GHz bandwidth and each 1 GHz bandwidth per channel, the total tile power consumption—in Watts (W)—with greater than 10% efficiency for the solid state power amplifiers, can be calculated as in Equation 1:

$$P_{total} = P_{upconversion} + P_{power\ amplifiers\ before\ feed\ network} + PA_{array}(4\ GaN\ under\ each\ 16 \times 16\ elements) \quad (1)$$

where $P_{total}$=4 channels*2 W/upconverter unit+4 channels*2 GaN/channel*12 W/GaN (10% efficiency)+12 W/GaN*4=8+96+48=146 W/tile.

To get close to 100 kW ERP, 64 (8×8) of these tiles are required to be integrated. Hence, the shared substrate has to dissipate 2 kW (additional+5 W for source is required, however, upconversion unit is shared). Size of each tile is estimated to be about 1.2 in. L×1.2 in. W×3 in. H (the source is not included). This is substantially smaller than the TWT volume (by a factor of approximately 20), but heat removal should be a consideration. In one example, a single tile may be approximately 10 square inches in area and, with proper mechanical design and use of miniaturized fin arrays, may need a fan for cooling to dissipate approximately 15 W/in$^2$.

Figure 3:
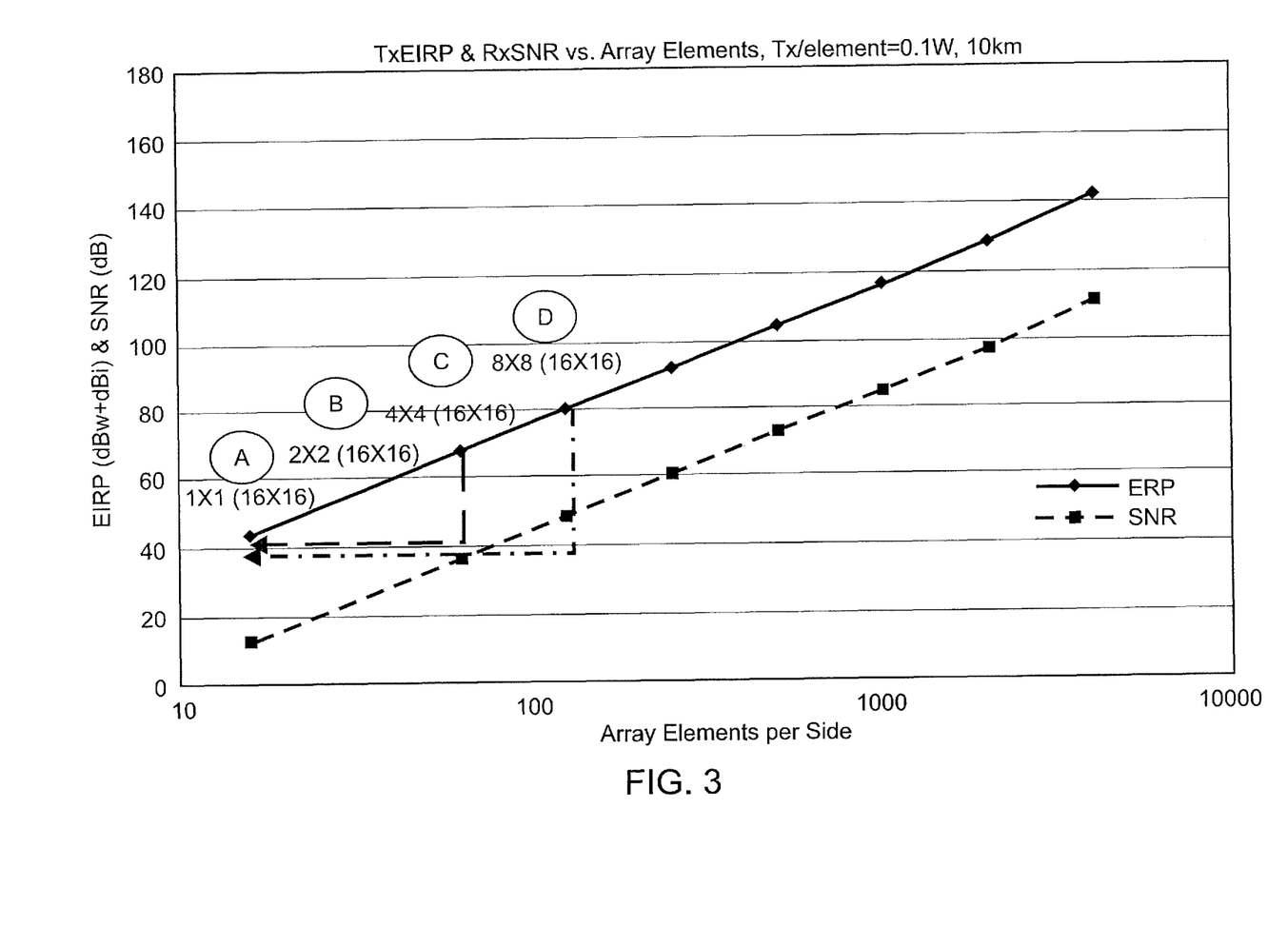
FIG. 3 is a graph illustrating the scaling of power and signal-to-noise ratio that follows scalability of waveguide antenna arrays, in accordance with one or more embodiments.

FIG. 3 is a graph illustrating the scaling of power and signal-to-noise ratio that follows scalability of waveguide antenna arrays 100, in accordance with one or more embodiments. FIG. 3 shows equivalent isotropically radiated power (EIRP), signal-to-noise (SNR), and system operating dynamic range of waveguide antenna arrays 100 corresponding to scaled arrays A, B, C, and D shown in FIG. 2 for a high power transmitter. The EIRP and SNR for each waveguide antenna array 100 can be seen to scale in a log-linear relationship by the number of the tiles 102 employed.

FIG. 4A and FIG. 4B are schematic diagrams showing two different examples of H-topology equal length feed networks 108 for scalable tile arrays (e.g., waveguide antenna array 100) and solid state based high power amplifier (e.g., PA 105) distribution under each tile 102 of an array 100, in accordance with one or more embodiments. FIGS. 4A and 4B show two examples of the solid state based high power amplifiers 105 distribution under the array of antenna elements 106 for each tile 102. Depending on the power delivery capability of the solid state amplifiers 105, a ratio of 1 PA for each antenna (using GaAs) may be designed as shown in FIG. 4A; or 1 PA per 4 to 16 antennas (using GaN) may be designed as shown in FIG. 4B.

Figure 4C:
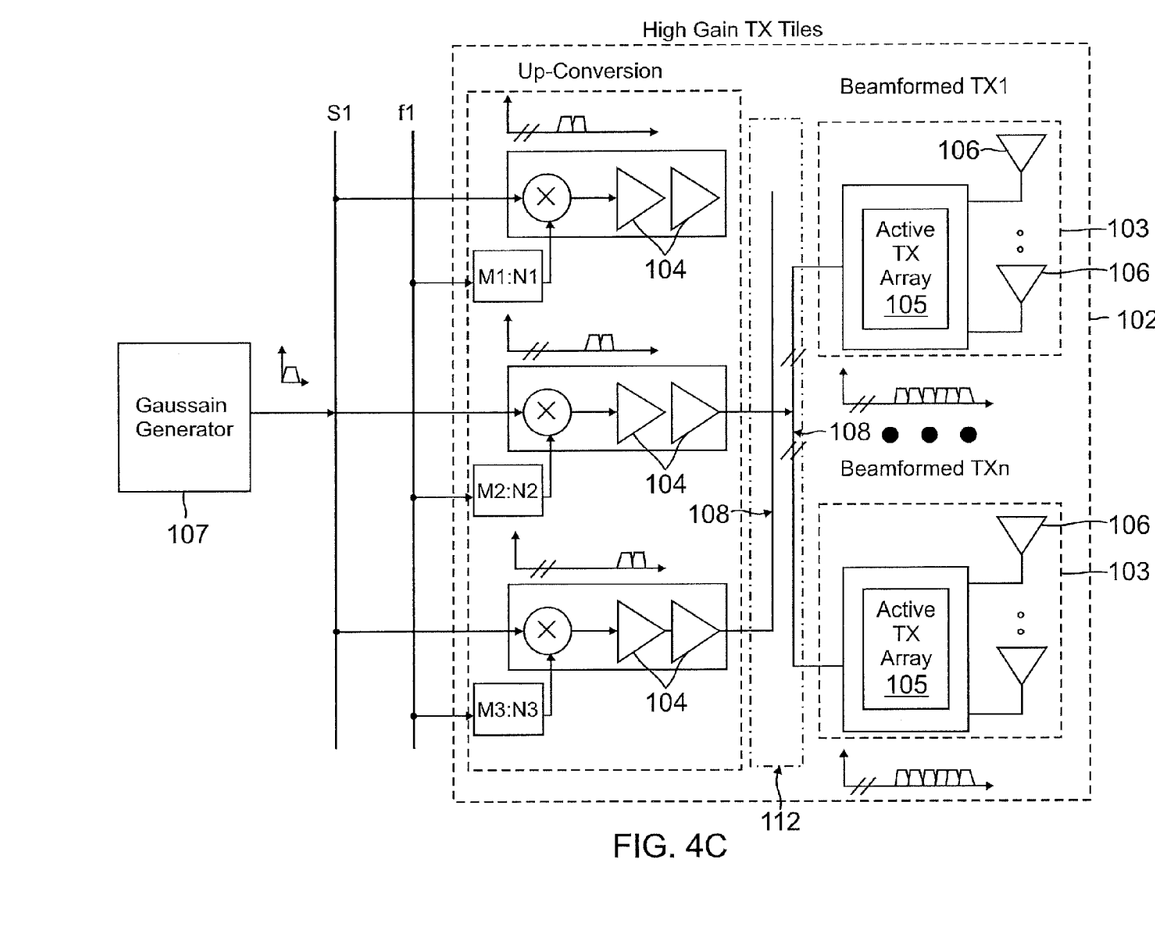
FIG. 4C is a block diagram for a scalable tile implementation of a jammer using single planar array tiles to form multiple planar array tiles of scalable waveguide antenna arrays, in accordance with one or more embodiments.

FIG. 4C is a block diagram for a scalable tile implementation using single planar array tiles to form a multiple planar array tile 102 for a scalable waveguide antenna array 100, in accordance with one or more embodiments.

In the example shown, four (n=4) single planar plates 103 may be used, for example, to form a quad TX tile 102. In this arrangement, using additional power amplifiers 104 rather than TWT amplifiers 105 facilitates integrating tiles 102 and feed network 108 by just adding more PA 104 for each channel and 105 for each array on the back side of the substrate of tile 102—which is the feed network 108—to compensate for splitting the signal. Scalability can be much simpler with this configuration than in the TWT implementation (see, e.g., FIG. 1), where the combiner waveguide needs to be re-designed. However, a TWT implementation can have more linear performance and less phase distortion over the solid state power amplifier, with multiple planar array tile implementation for communications applications. In one embodiment, a Gaussian (e.g., white noise) generator 107 may supply an input signal for the purpose of blind jamming other RF signals in the area.

Figure 5:
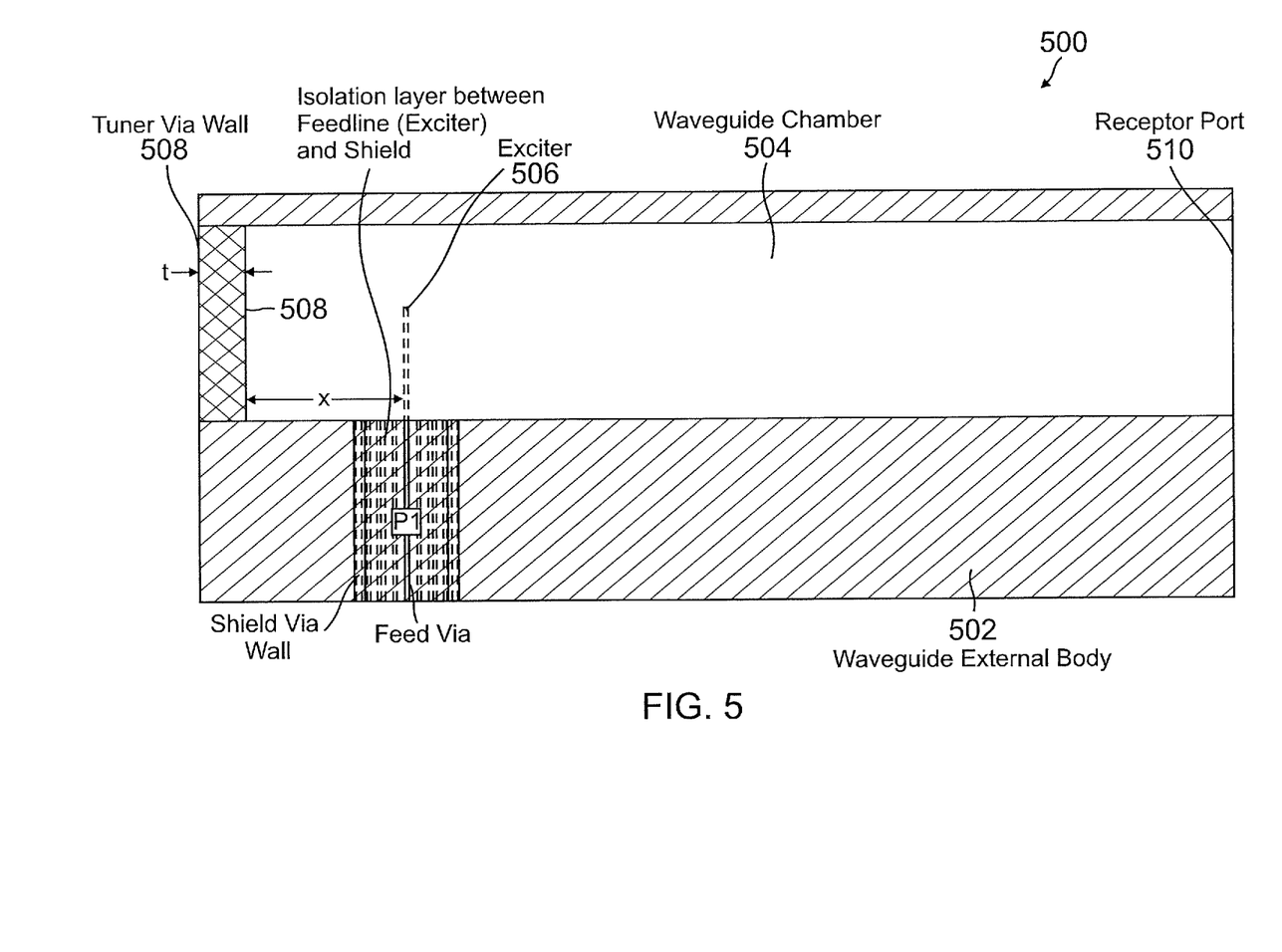
FIG. 5 is a cross sectional diagram illustrating a waveguide based combiner multiplexer for TX (or diplexer de-multiplexer in RX) for fabrication using 3-D printing, in accordance with one or more embodiments.

FIG. 5 is a cross sectional diagram illustrating a waveguided combiner multiplexer 500 for TX (or diplexer de-multiplexer in RX) for fabrication using 3-D printing, in accordance with one or more embodiments. FIG. 5 shows an example of a micro-machine implementation of the combiner multiplexer 500 for TX, or inversely the diplexer de-multiplexer 500 in RX (the same structure in either case—for brevity referred to as combiner-splitter 500 or combiner 500) using 3-D printer for low cost fabrication and then galvanizing combiner multiplexer (diplexer de-multiplexer) 500 with gold plating to produce the highly compact 3-D printed implementation for highly compact systems (e.g., scalable waveguide antenna array 100).

A plastic or similar substrate 502 may form the body and interior and exterior surfaces of the combiner 500. Waveguide chamber 504 of combiner 500 may have the form of a cavity in substrate 502, surrounded by metal-coated interior surfaces of substrate 502.

The feed-line (e.g., RF feed comprising a metallic conductor) can be extended to the waveguide chamber 504 such that it can act as an exciter 506 to launch an RF signal at the resonant frequency of desired operation. Spacing "x" between feed-line, exciter 506 and the end of waveguide, e.g., tuner via wall 508, may be a fraction of the half wavelength. In the example shown in FIG. 5, the separation x is about 40% of the half wavelength of the RF signal at the resonant frequency.

The dimensions (width and height) of the cavity of waveguide chamber 504 defines the resonant frequencies at different modes (e.g., TE or TM). The thickness "t" of the tuner wall 508 and the shape (width and height) of receptor port 510 can be adjusted to define the bandwidth of the waveguide, e.g., waveguide chamber 504. For example, a gold coated waveguide with width=2500 micron (2.5 mm) and height=1250 micron (1.25 mm) may have a cut off frequency of about 60 GHz.

The rectangular waveguide, such as embodied in FIG. 5, can be further expanded to address implementation of the "H-tree" or H-topology, equal length feed network. The central feed-line (e.g., feed network 108) is then extended to encompass the splitters such that propagation of traveling waves are guided to each section. So, for example, combiner multiplexer 500, 1:2 diplexer radio frequency waveguide splitter 600 (see FIG. 6) or 1:4 diplexer radio frequency waveguide splitter 700 (see FIG. 7) may be included as components of feed network 108.

All of combiner multiplexer, splitter diplexer de-multiplexer 500, as well as 1:2 diplexer radio frequency waveguide splitter 600 (see FIG. 6) and 1:4 diplexer radio frequency waveguide splitter 700 (see FIG. 7), are particularly suited to fabrication using 3-D printing technology which can be implemented by various methods such as selective laser sintering (SLS), fused deposition modeling (FDM), and stereolithography (SLA). Conductive metallic surfaces as needed may be supplied either concurrently or sequentially using other processes such as electroless plating.

3-D printing is a process of making three dimensional solid objects from a digital file. The creation of a 3-D printed object can be achieved using additive processes, also referred to as additive manufacturing. In an additive process an object is created by laying down successive layers of material until the entire object is created. Each of these layers can be seen as a thinly sliced horizontal cross-section of the eventual object. This virtual design is typically specified using a CAD (Computer Aided Design) or IGES (Initial Graphics Exchange Specification) file created using a 3-D modeling program (for the creation of a totally new object) which can be produced directly from the de-muxer simulation environment. A 3-D scanner can be used to make a 3-D digital copy of an object and put it into a 3-D modeling program.

In selective laser sintering (SLS) a high power laser may be used to fuse small particles of plastic, metal, ceramic, or glass powders into a mass that has the desired three dimensional shape. The laser selectively fuses the powdered material by scanning the cross-sections (or layers) generated by the 3-D modeling program on the surface of a powder bed. After each cross-section is scanned, the powder bed is lowered by one layer thickness. Then a new layer of material is applied on top and the process is repeated until the object is completed. All untouched powder remains as it is and becomes a support structure for the object. Therefore there is no need for any support structure with SLS as there may be with stereolithography (SLA). The unused powder can be used for the next printing.

Fused deposition modeling (FDM) technology employs a plastic filament or metal wire which is unwound from a coil and supplies material to an extrusion nozzle which can turn the flow on and off. The nozzle is heated to melt the material and can be moved in both horizontal and vertical directions by a numerically controlled mechanism, directly controlled by a computer-aided manufacturing (CAM) software package. The object is produced by extruding melted material to form layers as the material hardens immediately after extrusion from the nozzle. Software has been developed with this technology that automatically generates support structures if required. The FDM machine can dispense two materials, one for the model and one for a disposable support structure.

Stereolithography (SLA) uses photopolymerization to produce a solid part from a liquid. This technology employs a vat of liquid, ultraviolet curable, photopolymer resin and an ultraviolet laser to build layers of the object one at a time. For each layer, the laser beam traces a cross-section of the part pattern on the surface of the liquid resin. Exposure to the ultraviolet laser light cures and solidifies the pattern traced on the resin and joins it to the layer below. After the pattern has been traced, an elevator platform supporting the object descends by a distance equal to the thickness of a single layer, typically 0.05 mm to 0.15 mm. Then, a resin-filled blade sweeps across the cross section of the part, re-coating it with fresh material. On this new liquid surface, the subsequent layer pattern is traced, joining the previous layer. The complete three dimensional object is formed by repeating this process. Stereolithography requires the use of supporting structures which serve to attach the part to the elevator platform. While any of these methods can be used to define the 3-D substrate (e.g., substrate 502) for various waveguide volumes and cross sections, the process of gold or copper plating is additionally needed to ensure waveguides that propagate (launch) RF waves according to the desired modes and achieve reduced attenuation.

Electroless plating is often used to deposit nickel or copper metal onto plastic substrates. In one example, the surface of the plastic is, first, etched away using an oxidizing solution. Coating occurs when the plastic component (post-etching) is immersed in a solution containing metallic (nickel or copper) ions, which then bond to the plastic surface as a metallic coating. In order for electroplating (or electrolytic plating) to be successful, the plastic surface must first be rendered conductive, which can be achieved through basic electroless plating using copper in one case. Once the plastic surface is conductive, the substrate can be immersed in a solution. In the solution are metallic salts, connected to a positive source of current (cathode). An anodic (negatively charged) conductor is also placed in the bath, which creates an electrical circuit in conjunction with the positively charged salts. The metallic salts are electrically attracted to the substrate, where they create a metallic coat (in this case a layer of gold). As this process happens, the anodic conductor, typically made of the same type of metal as the metallic salts, dissolves into the solution and replaces the source of metallic salts, which is depleted during deposition. Thickness of electroplated gold should be at least 2 microns to accommodate for the attenuation due to the skin effect at the W-band.

Figure 6:
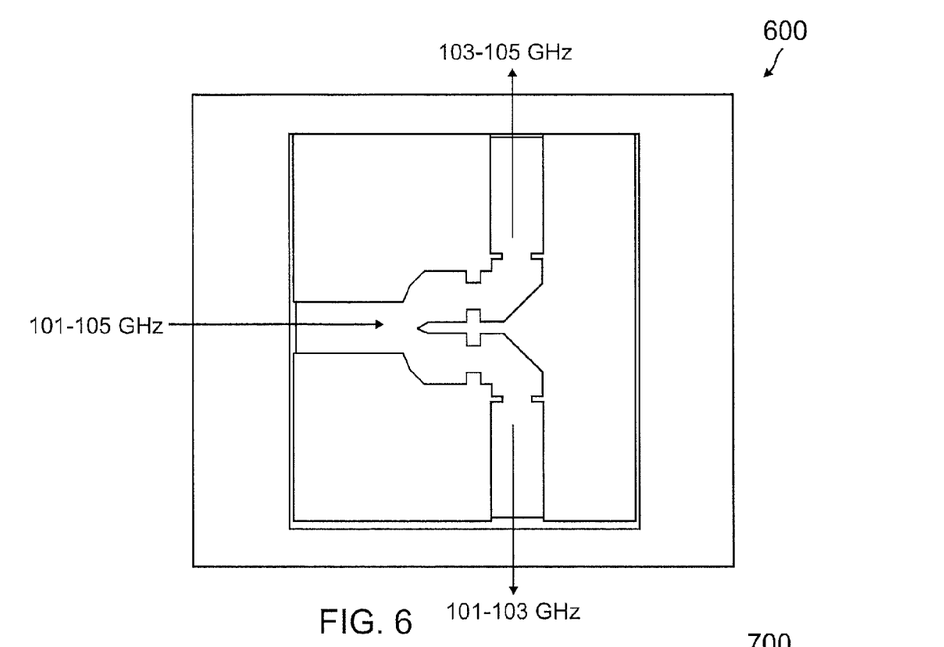
FIG. 6 is a diagram of a 1:2 diplexer radio frequency waveguide splitter, suitable for fabrication using 3-D printing, in accordance with an embodiment.

FIG. 6 illustrates a 1:2 (two-way) diplexer radio frequency waveguide splitter 600, suitable for fabrication using 3-D printing, in accordance with an embodiment. Diplexer radio frequency waveguide splitter 600 may be instrumental for effective distribution of the traveling wave for channelizing the signal using waveguide antenna array 100.

Waveguide splitter 600 may be shaped to split the wave (e.g., RF input signal) into waves with different frequency components by sizing each waveguide cross section to approximately the half wavelength for each frequency. Waveguide splitter 600 may secure a better than −20 dB S11 parameter (e.g., scattering of energy input to a port back to the same port) and negligible S21 (e.g., scattering of energy from a first port to a second port), which may be near 3 dB due to the approximate halving of signal.

FIG. 6 shows an example of the two-way splitter 600 operating at 100-105 GHz, showing the waves are split at the splitting junction by adjusting the length of waveguides chamber. The split waves, at 101-103 GHz and 130-105 GHz are then routed to the proper port at the same phase or alternatively at different phases depending on the length of the waveguide chamber.

Figure 7:
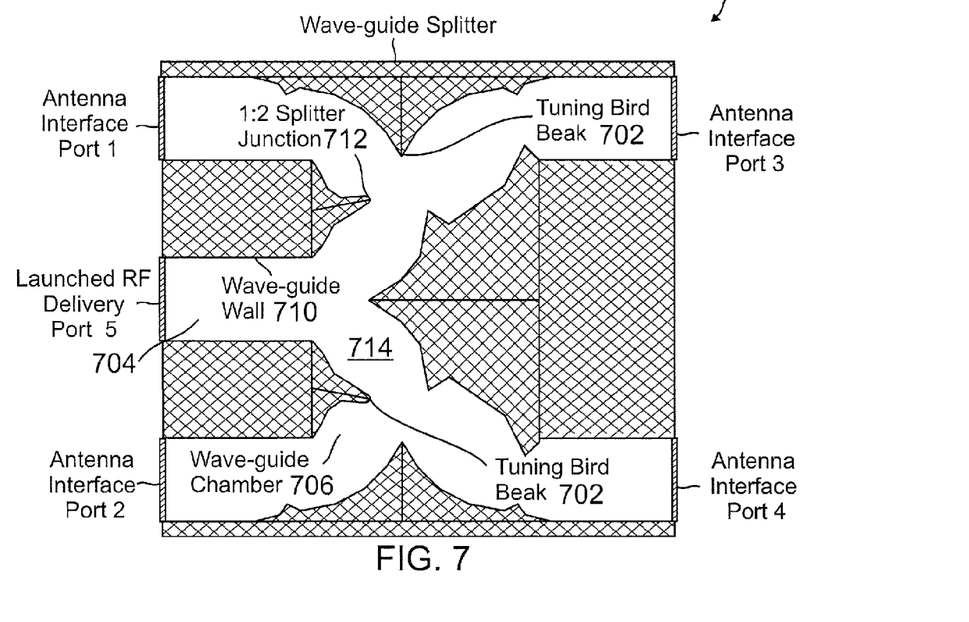
FIG. 7 is a diagram of a 1:4 diplexer radio frequency waveguide splitter, suitable for fabrication using 3-D printing, according to one embodiment.

FIG. 7 is a diagram of a 1:4 (four-way) diplexer radio frequency waveguide splitter 700, suitable for fabrication using 3-D printing, according to one embodiment.

As shown in FIG. 7, a "bird's beak" type of tuner 702 may be used to manage a better transmission coefficient and less reflection from the source of RF (e.g., reduce S11). The waveguide 704 may be surrounded by metallic coating or any material that is metal coated such that the conductivity of the walls of waveguide 704 are of that of the metallic substance. Each waveguide chamber 706 may be shaped and sized to be effectively about the half wavelength of the traveling wave in the media (e.g., air or vacuum).

Manufacturing of the waveguide 704 and waveguide splitter 700 from its 3-D design using a 3-D printing and metal plating (gold or other highly conductive metals) process may be essential to obtaining the particular shape and structure of radio frequency waveguide splitter 700. In FIG. 7, with waveguide splitter 700 operating at 95 GHz, the waves are split at the splitting junctions 710, 712, and 714. The split waves are then routed to the proper port at the same phase or alternatively at different phases depending on the length of the waveguide chambers 706.

At 97 GHz, for example, splitter 700 may operate almost ideally from port 1 to port 3 as the attenuation prevents traveling of the wave to port 2 depending on the cross section size of each channel. This unique feature can also be used for channeling of the signal to all or selected ports depending on the frequency of operation. For operation at 107 GHz, the splitting of the signal can be near perfect and half of the signal can be delivered to each port resulting in 3 dB attenuation at each receiving port. It should be mentioned that based on the reciprocity theorem, signals can be collected and combined from ports 1, 2, 3, and 4 and delivered to port 5.

FIG. 8 is a diagram showing a tile tessellation pattern for an 8×8, H-topology, equal length feed, waveguide based channelizer 800 for radio frequency transmission or reception, in accordance with one or more embodiments, using 2:1 (two-way) splitters (combiners) 802. FIG. 8 also illustrates that an H-topology, equal length feed network 810 may be comprised of an H-topology, equal length feed sub-network 820, which itself may be comprised of an H-topology, equal length feed sub-network 840. This recursively repeating at different size scales, or fractal-like, structure for the disclosed "H-tree" feed networks, and which can be implemented using tiles 102, facilitates the scalability of high gain waveguide antenna array 100, as described, for example, with reference to FIGS. 2 and 3.

The splitters 802 can have a very narrow bandwidth of about 5 GHz. As an example at 100 GHz center frequency, the Quality Factor ("Q") can be approximately 20. An array of 8×8 (or 4×4×4) channels and its corresponding micro-waveguide (e.g., as shown in FIG. 5, 6, or 7) may be based on distribution of RF center frequencies through waveguides. In one example, each of 75, 80, 85, 90, 95, 100, 105 and 110 GHz (eight) center frequencies may each have their own independent channelizer, where each array (e.g., array 860 of antenna elements 806) has a pitch factor (separation of an antenna element 806 to other elements 806 of the array 860) of a half wavelength. Shown in FIG. 8 is the overlay of the micro-waveguide (e.g., feed networks 810, 820, 840) with antenna elements 806. As an example each diplexer can route 4 of 1 GHz increments around in each center frequency with 1 GHz of channel guarded band frequency. Further diplexing (separating the sub channels) can be done to split each 1 GHz channel to four 200 MHz channels plus 200 MHz guard bands, and another four-way diplexer to provide 40 MHz output channels around the desired center frequency. Hence, a total of 8 planar plates with 4×4×4=64 splits of 40 MHz apart can be built over the 75-110 GHz bandwidth. The result can be a total of 512 of 40 MHz channels in the W-band planar or stacked over a cubical volume. For the example illustrated the physical size of the antenna element array 862 for channelizer 800 may measure about 420 mm×360 mm.

FIG. 9 is a tile tessellation pattern for an 8×8, H-topology, equal length feed, waveguide based channelizer 900 for radio frequency transmission or reception, in accordance with one or more embodiments, having a more compact layout than FIG. 8 by using 4:1 splitters (combiners).

The array 962 for channelizer 900 can have a tighter pitch factor (separation of an antenna element 906 to other elements 906 of the array 962) than that of channelizer 800, as shown in FIG. 9. An array of 4×4×4 (64) channels and its corresponding micro-waveguide (e.g., feed network 910) has been designed based on distribution of RF center frequencies through waveguides. The array 962 has a pitch factor of 1.4 (separation of an antenna element to the other element) of greater than half wavelength such that there can be enough margin for launch of the 10 GHz signal. Shown in FIG. 9 is the overlay of the micro-waveguide (e.g., feed network 910) on the antenna array 962 of antenna elements 906. The waveguide illustration has been shaded to show the main cavity chamber being divided into sub-chambers that feed the antenna array (elements 906) directly, as another example of recursive, H-topology, equal length feed network 910. The recursive, H-topology facilitates building a low cost frequency separator for the array of tiles 102 of high gain waveguide antenna array 100.

FIG. 10 is a pictorial representation of an example of a narrow band (1 GHz) signal at 84 GHz amplified and transmitted through an 8×8 scalable array channelizer 1000, in accordance with one or more embodiments. A UWB signal of 75-110 GHz may be channelized to sub-bands. Accordingly, the maximum width or length of the 4×4×4 array of channelizer 1000 can be 32,000 micron or 32 mm. Each of the chanellizers 1000 can then fit underneath the 16×16 RHCP or LHCP (right or left, respectively circularly polarized) arrays (e.g., such as array 962) to transmit or receive a very narrow band signal, an ideal solution to implement a highly compact scanner, jammer, or signal TX-RX (e.g., transponder) for a "hotspot" (e.g., high noise or crowded RF environment). Further de-muxing to 40 MHz channels using an array of diplerxers can also be achieved using one or more embodiments. FIG. 10 illustrates one example that a narrow band (1 GHz) signal at 84 GHz can be amplified and transmitted through the 16×16 array.

FIG. 11 is a pictorial representation of an example of a narrow band (160 MHz) signal at 92.16 GHz amplified and transmitted through a 16×16 scalable array 1100, in accordance with one or more embodiments. FIG. 11 illustrates a factor of 4× more channel packing compared to FIG. 10. In this case, a 160 MHz channel at center frequency of 92.16 GHz is routed through a chain of diplexers (e.g., a portion of an H-topology, equal length feed network) and fed to the UWB antenna over the 16×16 element LHCP array over the 75-110 GHz bandwidth with 32 dBi gain.

FIG. 12 is a diagram showing an equal-distance waveguide for radio frequency signal distribution to active units under the antenna for a 4×4 antenna-element array tile, in accordance with one embodiment. FIG. 12 shows an alternative embodiment for shaping the waveguides of the H-topology, equal-distance waveguide feed network 1210 for RF signal distribution to the active units (e.g., power amplifiers 105) under antenna elements 106 for tiles 102.

Figure 13:
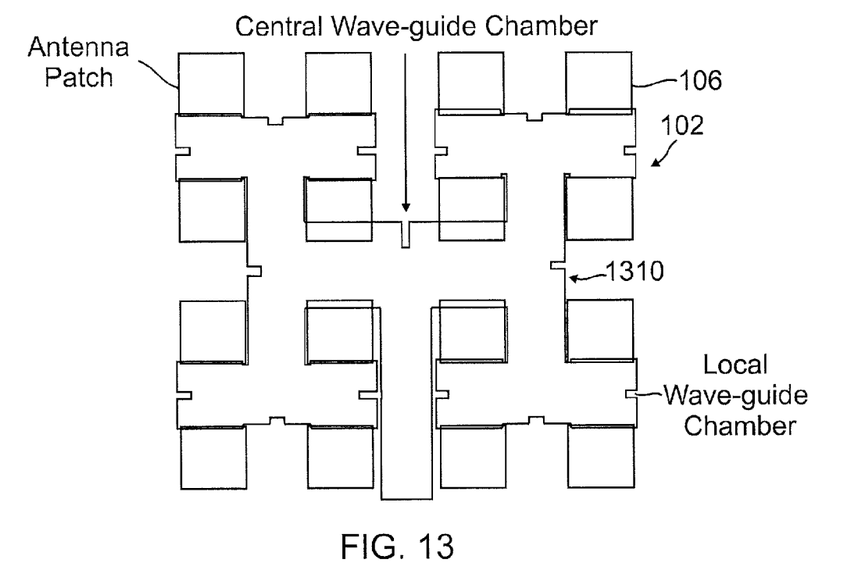
FIG. 13 is a diagram showing an equal-distance waveguide for radio frequency signal distribution to active units under the antenna for a 4×4 antenna-element array tile, in accordance with another embodiment.

FIG. 13 is a diagram showing an equal-distance waveguide for radio frequency signal distribution to active units under the antenna for a 4×4 antenna-element array tile, in accordance with another embodiment. FIG. 13 shows another alternative embodiment for shaping the waveguides of the H-topology, equal-distance waveguide feed network 1310 for RF signal distribution to the active units (e.g., power amplifiers 105) under antenna elements 106 for tiles 102.

Figure 14A:
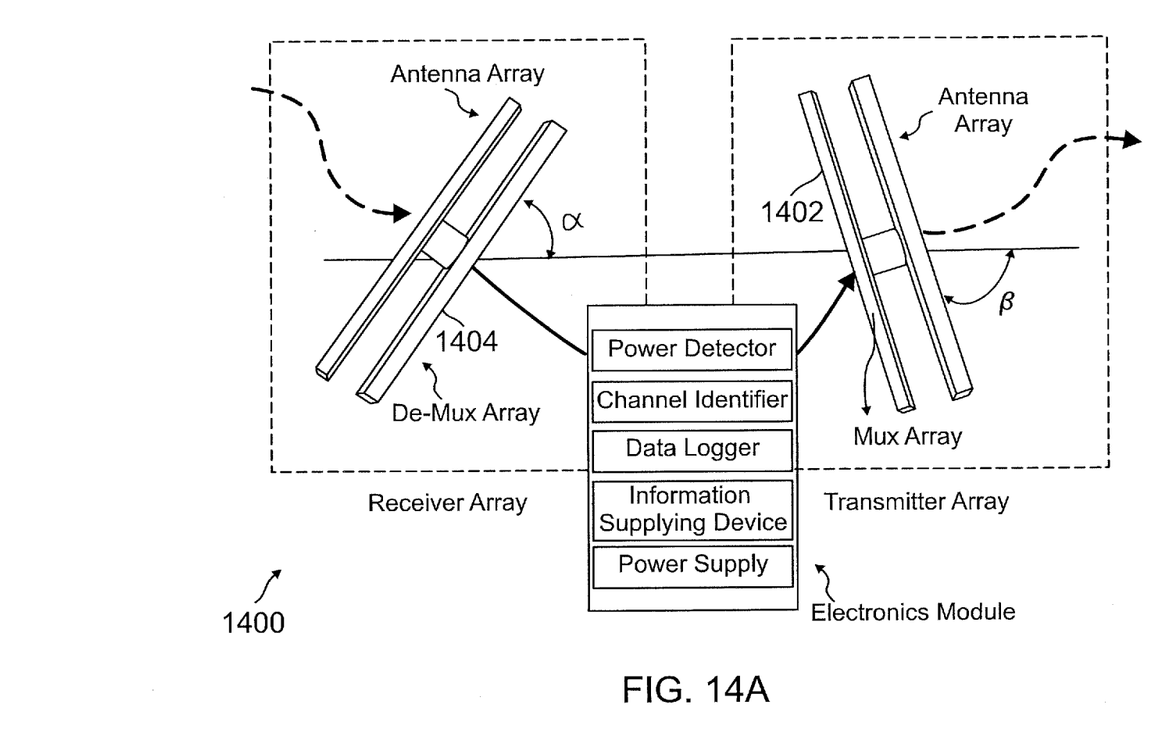
FIG. 14A is a combined pictorial and system block diagram showing a system-level integrated TX-RX system with mux and de-mux array for routing of high data rate signal implemented using 3-D printing and electro-less plating, in accordance with one or more embodiments.
Figure 14B:
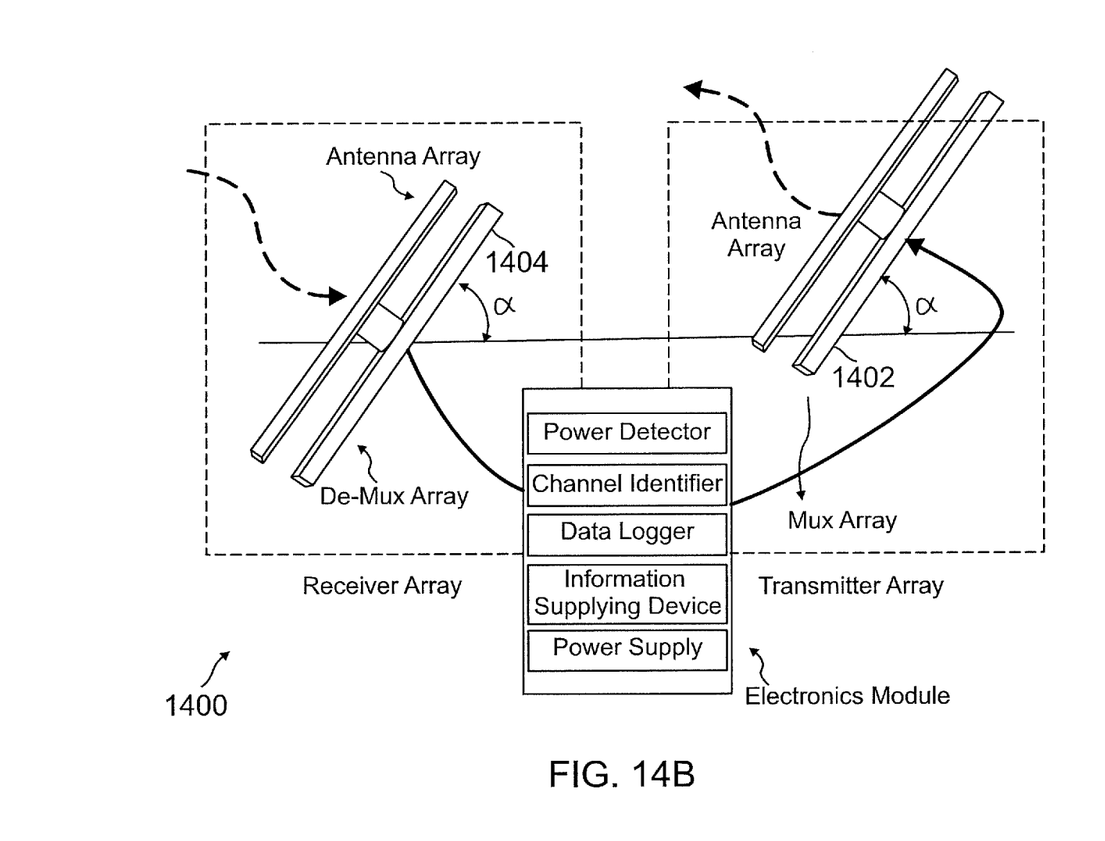
FIG. 14B is a combined pictorial and system block diagram showing a system-level integrated TX-RX system with mux and de-mux array for a jammer or deception router implemented using 3-D printing and electro-less plating, in accordance with one or more embodiments Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

FIG. 14A (FIG. 14B) is a combined pictorial and system block diagram showing a system-level integrated TX-RX system 1400 with mux array 1402 and de-mux array 1404 (e.g., channelizers such as shown in FIGS. 10, 11) implemented using 3-D printing and electro-less plating, in accordance with one or more embodiments. The disclosed embodiments of scalable, tile implemented, high gain waveguide antenna arrays 100 can be used to connect two separate TX and RX modules through a high bandwidth (35 GHz) pipeline and amplify the output for long distance link (FIG. 14A) or radar deception (e.g., jamming as shown in FIG. 14B).

Embodiments described herein illustrate but do not limit the disclosure. It should also be understood that numerous modifications and variations are possible in accordance with the principles of the present disclosure. Accordingly, the scope of the disclosure is best defined only by the following claims.

What is claimed is:
1. A system comprising:
an array of antenna array tiles arranged in a square tessellation pattern;
an H-topology, equal length feed network having an initial injection point and comprising a plurality of diplexer radio frequency waveguide splitters arranged to feed a radio frequency input from the initial injection point to each of the antenna array tiles, wherein:
a path length of the radio frequency input from the initial injection point to each of the antenna array tiles is of substantially the same length; and
each diplexer radio frequency waveguide splitter channelizes the radio frequency input into at least two distinct frequency bands; and
the H-topology, equal length feed network is itself comprised of a second H-topology, equal length feed network configured to feed the at least two distinct frequency bands of the radio frequency input between the initial injection point and each antenna array tile.

2. The system of claim 1, wherein:
each antenna array tile comprises an H-topology, equal length feed sub-network of the H-topology, equal length feed network.

3. The system of claim 1, wherein:
the array of antenna array tiles comprises a number of tiles;
an equivalent isotropically radiated power of the array of antenna array tiles is proportional to the number of tiles in the array of antenna array tiles.

4. The system of claim 1, wherein:
the array of antenna array tiles comprises a number of tiles;
a signal-to-noise ratio of the array of antenna array tiles is proportional to the number of tiles in the array of antenna array tiles.

5. The system of claim 1, wherein:
the array of antenna array tiles comprises a number of tiles;
the array of antenna array tiles is scalable, wherein a total number of distinct tile structures, each antenna array tile having exactly one of the distinct tile structures, is strictly less than the number of tiles in the array of antenna array tiles.

6. The system of claim 1, wherein:
cooling of the tiles is achieved through a planar arrangement of the tiles in the square tessellation pattern.

7. The system of claim 1, wherein:
the diplexer radio frequency waveguide splitters are comprised of a plastic substrate, having metal plated waveguide cavities.

8. A method comprising:
transmitting or receiving a radio frequency signal using an antenna array comprising a plurality of antenna array tiles arranged in a square tessellation pattern;
diplexing the radio frequency signal, using at least one diplexer radio frequency waveguide splitter, into a plurality of sub-bands of the radio frequency signal; and
connecting the sub-bands of the radio frequency signal between an initial injection point of an H-topology, equal length feed network and each antenna array tile using the H-topology, equal length feed network, wherein the H-topology, equal length feed network has an equal length signal path between the initial injection point and each antenna array tile for each sub-band of the radio frequency signal; and
feeding the radio frequency signal through a second H-topology, equal length feed network, wherein the H-topology, equal length feed network is itself comprised of the second H-topology, equal length feed network and connects the sub-bands of the radio frequency signal between the initial injection point and each antenna array tile via the second H-topology, equal length feed network.

9. The method of claim 8, further comprising:
increasing a signal-to-noise ratio of the radio frequency signal proportional to the number of tiles in the array of antenna array tiles and corresponding scaling of the H-topology, equal length feed network.

10. The method of claim 8, further comprising:
increasing an equivalent isotropically radiated power of the radio frequency signal proportional to the number of tiles in the array of antenna array tiles and corresponding scaling of the H-topology, equal length feed network.

11. The method of claim 8, further comprising:
channelizing the radio frequency signal through the H-topology, equal length feed network to form a plurality of sub-band signals, each sub-band signal originally included in the radio frequency signal, such that each sub-band signal is separated from every other sub-band signal of the plurality of sub-band signals.

12. The method of claim 11, further comprising:
feeding each of the plurality of sub-band signals via the H-topology, equal length feed network to a corresponding antenna array tile.

13. The method of claim 11, further comprising:
routing a sub-band signal having a particular center frequency through a chain of diplexers of the H-topology, equal length feed network; and
transmitting or receiving a narrow band signal by feeding the sub-band signal having the particular center frequency to a circularly polarized antenna array of the plurality of antenna array tiles.

14. The method of claim 8, further comprising:
scaling the antenna array by plugging one or more pluggable tiles of the plurality of antenna array tiles onto the square tessellation pattern.

15. The method of claim 8, further comprising:
cooling one or more tiles of the plurality of antenna array tiles through a planar arrangement of the tiles in the square tessellation pattern.

* * * * *